US012202332B2

(12) United States Patent
Matijevich et al.

(10) Patent No.: US 12,202,332 B2
(45) Date of Patent: Jan. 21, 2025

(54) ALTERNATIVE FUEL SYSTEM

(71) Applicants: Tony Matijevich, Chino, CA (US);
Mark Matijevich, Chino, CA (US);
Terry McCrea, Chino, CA (US)

(72) Inventors: Tony Matijevich, Chino, CA (US);
Mark Matijevich, Chino, CA (US);
Terry McCrea, Chino, CA (US)

(*) Notice: Subject to any disclaimer, the term of this patent is extended or adjusted under 35 U.S.C. 154(b) by 50 days.

(21) Appl. No.: 17/959,157

(22) Filed: Oct. 3, 2022

(65) Prior Publication Data

US 2023/0027873 A1    Jan. 26, 2023

Related U.S. Application Data

(63) Continuation of application No. 16/953,725, filed on Nov. 20, 2020, now Pat. No. 11,465,493, which is a continuation of application No. 15/721,807, filed on Sep. 30, 2017, now Pat. No. 10,850,610.

(60) Provisional application No. 62/402,792, filed on Sep. 30, 2016.

(51) Int. Cl.
*B60K 15/063* (2006.01)
*B60K 15/07* (2006.01)
*F17C 1/00* (2006.01)
*F17C 13/08* (2006.01)
*B60K 15/03* (2006.01)

(52) U.S. Cl.
CPC ............ *B60K 15/063* (2013.01); *B60K 15/07* (2013.01); *F17C 1/00* (2013.01); *F17C 13/083* (2013.01); *B60K 2015/03118* (2013.01); *B60K 2015/03269* (2013.01); *B60K 2015/03407* (2013.01); *B60K 2015/0636* (2013.01); *B60K 2015/0638* (2013.01); *B60Y 2200/14* (2013.01); *B60Y 2410/114* (2013.01); *F17C 2205/0134* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2270/0171* (2013.01)

(58) Field of Classification Search
CPC .................. B60K 15/063; B60K 15/07; B60K 2015/03118; F17C 1/00; F17C 13/083
USPC ........................................................ 180/69.5
See application file for complete search history.

(56) References Cited

U.S. PATENT DOCUMENTS

| | | | |
|---|---|---|---|
| 6,257,360 B1* | 7/2001 | Wozniak | B60K 15/013 180/69.5 |
| 6,418,962 B1* | 7/2002 | Wozniak | F17C 1/02 220/586 |
| 7,882,587 B2* | 2/2011 | Tagliaferri | B60K 15/07 15/340.1 |
| 8,807,256 B2* | 8/2014 | Gibb | B60K 15/07 180/69.5 |
| 8,985,065 B2* | 3/2015 | Buchanan | F02D 41/0027 123/3 |

(Continued)

*Primary Examiner* — Hau V Phan
(74) *Attorney, Agent, or Firm* — Rutan & Tucker LLP; Hani Z. Sayed

(57) ABSTRACT

An apparatus and a method are provided for an alternative fuel system, comprising a plurality of fuel tank assemblies interconnected with fuel lines; the plurality of fuel tank assemblies comprising a CNG fuel tank and a fuel tank shield; wherein a first and second fuel tank assembly is disposed immediately in front of a rear wheel assembly, and a third fuel tank assembly is disposed immediately behind the rear wheel assembly.

18 Claims, 4 Drawing Sheets

(56) References Cited

U.S. PATENT DOCUMENTS

| | | | | |
|---|---|---|---|---|
| 9,080,241 B2* | 7/2015 | Delfino | .................... | C25B 1/04 |
| 9,579,969 B2* | 2/2017 | Crist | ...................... | B60K 15/07 |
| 10,850,610 B2* | 12/2020 | Matijevich | ........... | B60K 15/063 |
| 11,465,493 B2* | 10/2022 | Matijevich | ................ | F17C 1/00 |
| 2006/0032532 A1* | 2/2006 | Suess | ................... | F17C 13/083 |
| | | | | 137/266 |
| 2009/0283068 A1* | 11/2009 | Willison | ................ | F02M 37/46 |
| | | | | 123/445 |
| 2012/0161430 A1* | 6/2012 | Mulanon | ............... | F17C 13/084 |
| | | | | 280/834 |
| 2014/0061266 A1* | 3/2014 | Milton | ............. | B60K 15/03006 |
| | | | | 224/404 |
| 2015/0112506 A1* | 4/2015 | Hanlin | ............. | B60K 15/03006 |
| | | | | 137/259 |

* cited by examiner

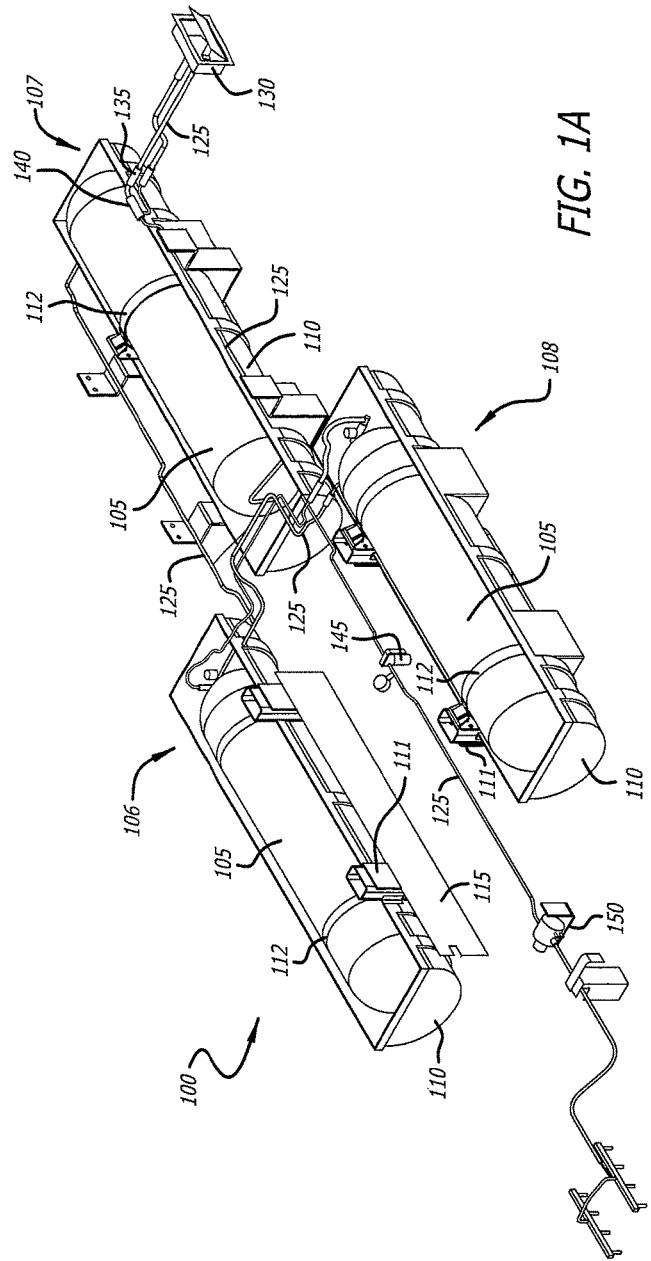

ALTERNATIVE FUEL SYSTEM

PRIORITY

This application claims the benefit of and priority to U.S. patent application Ser. No. 16/953,725 filed on Nov. 20, 2022 and U.S. patent application Ser. No. 15/721,807 filed Sep. 30, 2017, now issued U.S. Pat. No. 10,850,610 and U.S. Provisional Application, entitled "CNG Fuel Tank Architecture," filed on Sep. 30, 2016 and having application Ser. No. 62/402,792.

FIELD

The field of the present disclosure generally relates to motor vehicles. More particularly, the field of the invention relates to a system and a method for a vehicle chassis having alternative fuel tanks longitudinally disposed immediately in front and behind a rear wheel assembly.

BACKGROUND

A fuel tank is a safe container for flammable fluids, such as gasoline. Though any storage tank for fuel may be so called, the term is typically applied to part of an engine system in which the fuel is stored and propelled (fuel pump) or released (pressurized gas) into an engine. Fuel tanks range in size and complexity from the small plastic tank of a butane lighter to multi-chambered designs.

The maximum distance a combustion-engine powered car with a full tank can cover is the product of the tank capacity and its fuel efficiency (as in miles per gallon). While larger tanks increase the maximum distance, they also take up more space and (especially when full) add to the total weight, requiring higher fuel consumption for the same performance. Fuel-tank capacity is therefore the result of a trade-off in design considerations. For most compact cars, the capacity is in the range 12-17 US gallons. For safety considerations, in modern cars the fuel tank is usually located ahead of the rear axle, out of the crumple zones of the car.

As compared to their gasoline-powered counterparts, natural gas vehicles (NGVs) may offer an array of economic and environmental benefits including low-cost, improving regional air quality, reducing greenhouse gas emissions, thereby reducing our dependence on petroleum and providing a pathway to a hydrogen economy.

Practically, however, NGVs have not been a perfect substitute for gasoline powered vehicles, because unlike liquid fuel, which consistently holds about the same volume of fuel across a broad range of conditions, compressed natural gas (CNG), for example, can expand and contract significantly depending on temperature. For example, under industry standard conditions, a CNG tank on a vehicle may be able to hold 20 gasoline gallon equivalents, but on a hot day the gas will expand and the tank may only fill to 75% (or less) of its potential. Thus, CNG vehicles may have a reduced driving range prior to refueling as compared to their conventional fuel counterparts.

What is needed, therefore, is an alternative fuel system engineered to maximize the design benefits of today's gasoline engines that can serve as a direct replacement for OEM gasoline injection systems for both CNG and propane fuel systems, while also operating within California Air Resources Board (CARB) and U.S. Environmental Protection Agency (EPA) requirements. What is also needed is an alternative fuel system that is configured to increase a vehicle's range without adding excess weight and adversely affecting the vehicle's handling.

BRIEF DESCRIPTION OF THE DRAWINGS

The drawings refer to embodiments of the present disclosure in which:

FIG. 1A illustrates an isometric perspective view of the CNG fuel tank architecture;

Figure 1B:
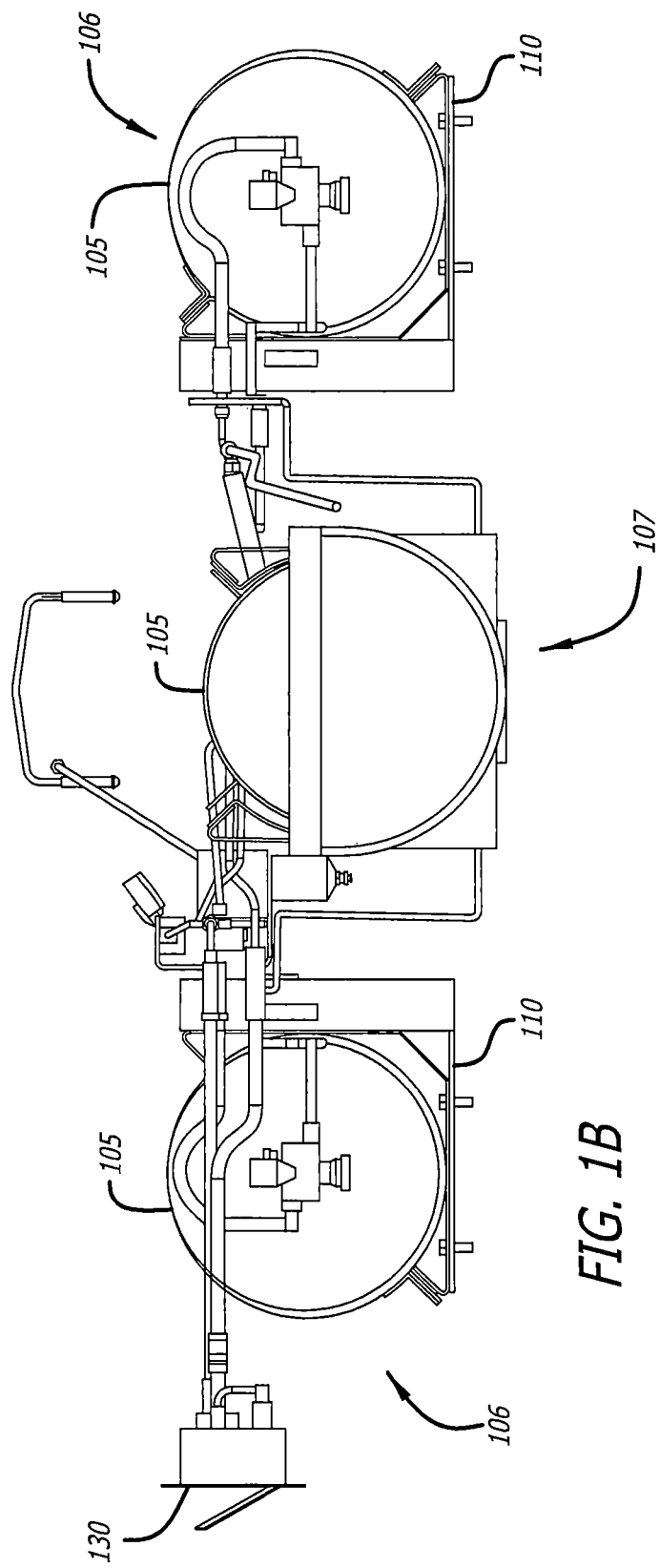
FIG. 1B illustrates a side view of the CNG fuel tank architecture of FIG. 1.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and corresponding methods for an alternative fuel system with respect to a motor vehicle. The alternative fuel may be CNG, propane, or any other fuel source without limitation. In the interest of brevity, the example of CNG is used in the embodiments described herein. It should be understood that the apparatus and methods described herein may be utilized so as to "convert" a gasoline-powered motor vehicle into an alternative fuel-powered vehicle.

In one embodiment, a plurality of alternative fuel tanks are disposed longitudinally, immediately about the rear-wheel assembly of a motor vehicle. Preferably, a plurality of CNG fuel tanks are disposed in a parallel and longitudinal fashion in front of the rear-wheel assembly, and oriented so as to be disposed immediately outside the central chassis. Moreover, one or more CNG fuel tanks may be disposed immediately behind the rear-wheel assembly, and inside the central chassis.

In one embodiment, a compressed natural gas fuel system is disclosed, comprising a plurality of fuel tank assemblies interconnected with fuel lines; the plurality of fuel tank assemblies comprising a CNG fuel tank and a fuel tank shield; wherein a first and second fuel tank assembly are disposed immediately in front of a rear wheel assembly, and a third fuel tank assembly disposed immediately behind the rear wheel assembly.

In one embodiment, the third fuel tank assembly is disposed longitudinally between the rear wheels of a vehicle. In yet another aspect, the first and second fuel tank assemblies are disposed longitudinally in line with the rear wheels of the vehicle.

In one embodiment, the third fuel tank assembly comprises a plurality of CNG fuel tanks. In another embodiment, the fuel lines couple a defueling assembly with a bulkhead. In yet another embodiment, the high pressure fill and check valve assembly is coupled to the bulkhead and fuel lines. In one embodiment, the check valve assembly is configured to provide unidirectional flow of CNG so as to prevent sudden backflow of pressurized natural gas. In another embodiment, caged structures are disposed around the first and second CNG fuel tanks.

In another embodiment, a method of converting a gasoline-powered motor vehicle to a natural gas vehicle is described comprising: reviewing the chassis and body specifications of the motor vehicle so as to ensure optimal system integration; optimizing the design and layout of an alternative fuel system to match a customer specification; removing an OEM fuel system; installing a plurality of fuel tanks configured to house a natural gas and corresponding high and low pressure fuel lines; installation of safety equipment, where the safety equipment comprises one or more gravel shields configured to protect the fuel tanks; and performing at least a first diagnostic test of the fuel system to ensure proper drivability.

FIG. 1A illustrates an isometric perspective view of the CNG fuel tank architecture according to one embodiment. As shown, a plurality of CNG fuel tanks 105 are each disposed in a fuel tank shield 110. In one embodiment, the CNG fuel tanks 105 are configured so as to have a CNG fueling system pressure of substantially 3,600 psi. It should be understood that in various embodiments, the fueling system pressure may be substantially 3,000 psi, or any other pressure rating without limitation. It is envisioned that the CNG fuel tanks 105 are configured to hold up to 125% of their operating pressure. Thus, a 3,000 psi tank may be filled to 3,750 psi and a 3,600 tank can be filled to 4,500 psi. Consequently, this extra capacity makes it possible to fill the tanks 105 to a higher pressure on hot days when the gas is expanding, as well as compensate for the heat of recompression. The CNG fuel tanks 105 may be made of any material, including without limitation aluminum, steel, carbon fiber, and the like.

The fuel tank shields 110 are configured so as to add an extra layer of protection to the CNG fuel tanks 105. In one embodiment, the fuel tank shields 110 feature high-density, cross linked polyethylene, so as to dissipate stress and impact from gravel, for example. It is envisioned that the fuel tank shields 110 are resistant to extremely hot and cold temperatures. Preferably, the fuel tank shields 110 are constructed from highly strong yet light weight material, so as to not materially affect the handling characteristics of the vehicle. In one embodiment, the fuel tank shields 110 feature a substantially cylindrical shape with a prominent cavity so that the CNG fuel tanks 105 may each be disposed therein. It should be understood that the fuel tank shields 110 may be coupled with various straps, brackets 111, and the like so as to mate with the chassis of the motor vehicle, without limitation. In one embodiment, for example, fuel tank straps 112 are configured to retain the CNG fuel tanks 105 within the fuel tank shields 110.

In embodiments, the fuel tank shields 110 may be coupled with a supplemental heat shield 115, with the specific purpose of preventing excess heat from effecting the capacity of the CNG fuel tanks 105. In one embodiment, the supplement heat shield 115 is substantially planar, and may be comprised of a substantially metallic material. Similarly, it is envisioned that one or more layers of woven silica with a flexible aluminized finish may be disposed on the heat shield 115.

In embodiments, a method of converting a gasoline-powered motor vehicle is described, including the steps of reviewing the chassis and body specifications of the motor vehicle so as to ensure optimal system integration; optimizing the design and layout of the new fuel system to match a customer specification; removal of an OEM fuel system; installation of a plurality of cylinders configured to house a gas such as CNG; installation of high and low pressure fuel lines to provide complete vehicle reliability; installation of safety equipment, where the safety equipment comprises one or more gravel shields configured to protect fuel tanks; and at least a first diagnostic test of the fuel system to ensure proper drivability.

As shown in FIG. 1A, the CNG fuel tanks 105 may be interconnected using a plurality of fuel lines 125. In one embodiment, a defueling assembly 130 is disposed near the rear-most CNG fuel tank 107. It should be understood that the defueling assembly 130 is configured so as to safely remove CNG from the CNG fuel tanks 105 prior to servicing the CNG vehicle, for example. The CNG that is removed from the tanks may be routed in any of various ways, including for example, suction via a compressor, pipeline, other low pressure natural gas system or it may be atmospherically vented. In one embodiment, fuel lines 125 couple the defueling assembly 130 with bulkhead 135.

A high pressure fill and check valve assembly 140 is coupled to the bulkhead 135, and fuel lines 125. It should be understood that the exact placement of the check valve assembly 140 may be varied. In embodiments, more than one check valve assembly 140 may be utilized. In one embodiment, the check valve assembly 140 is configured so as to provide uni-directional flow of CNG and can prevent sudden backflow of pressurized natural gas. A large variety of end connections such as female BSP threads and tube fittings may be utilized, without limitation. Also, as shown in FIG. 1, an in-line filter 145 is coupled between the plurality of CNG fuel tank assemblies 106-108 and a gas regulator 150 using the fuel lines 125. In one embodiment, the in-line filter 145 is configured so as to remove particulates and other undesirable debris from the fueling system 100. In one embodiment, the gas regulator 150 is configured to automatically cuts off the flow of CNG at a predetermined pressure level.

Figure 2:
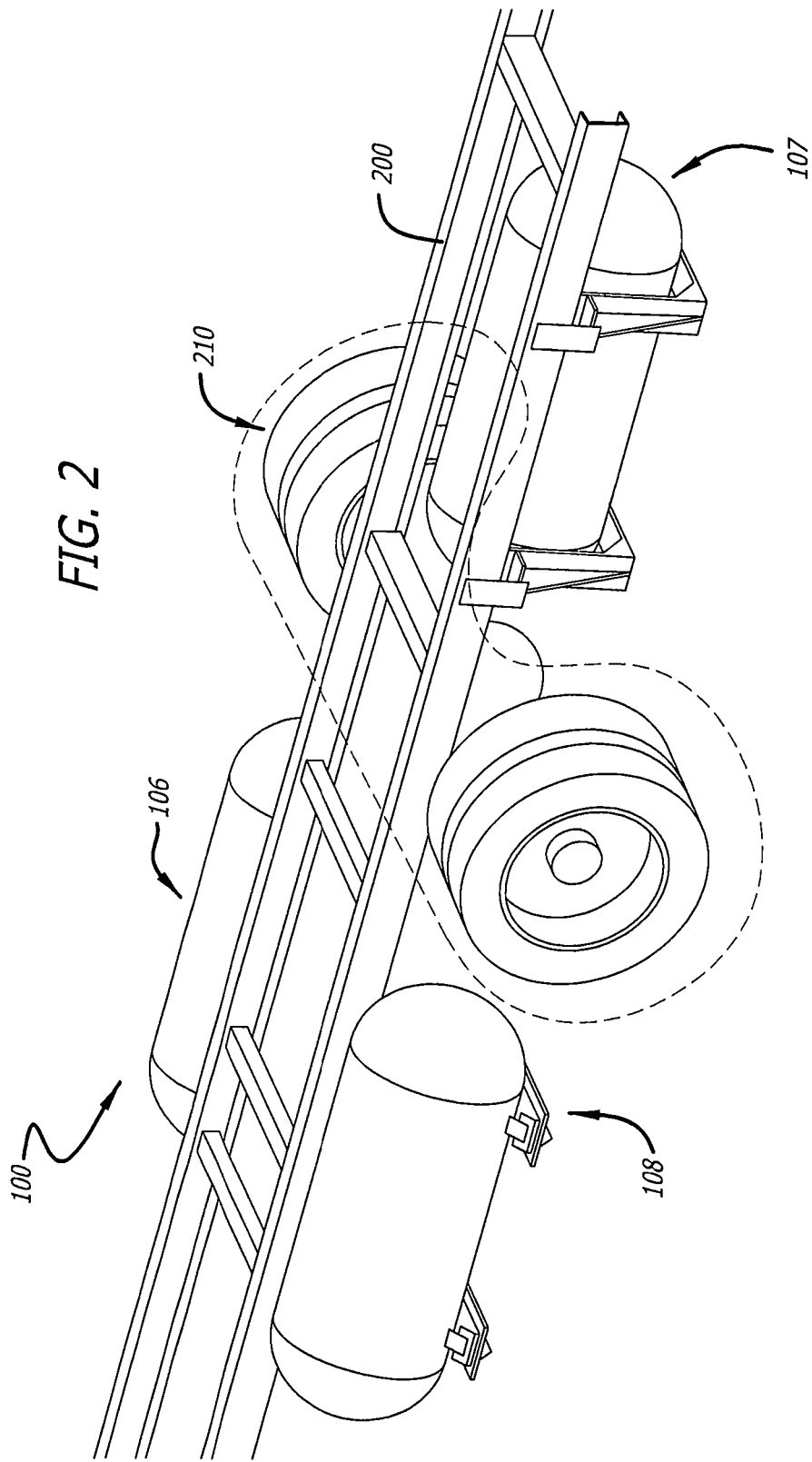
FIG. 2 illustrates an isometric perspective view of the CNG fuel tank architecture of FIG. 1, when disposed with an exemplary vehicle chassis.

FIG. 1B illustrates a side perspective view of the CNG tank architecture of FIG. 1. As shown, a key aspect of the embodiments described herein is the specific layout of the CNG fuel tank architecture 100. FIG. 2 illustrates an exemplary chassis 200, and the CNG fuel tank architecture 10. In one embodiment, the fuel tank assemblies 106, 108 are disposed in a longitudinal fashion immediately in front of the rear wheel assembly 210. Similarly, the fuel tank assembly 107 is disposed in the middle of the chassis 200, immediately behind the rear wheel assembly 210. It should be understood that such an arrangement provides superior weight distribution and balance with respect to the chassis' suspension geometry.

In one embodiment, each of the fuel tank assemblies 106-108 may be of substantially the same size, weight, and capacity. In one embodiment, the fuel tank assemblies 106 and 108 have substantially the same dimensions, but the fuel tank assembly 107 may be smaller or larger by comparison. It should be understood that the precise location of the fuel tank assembly 107 may be varied without limitation, depending on the application. Thus, it is envisioned that the fuel tank assembly 107 may be disposed directly in between the rear wheels of the rear wheel assembly, or partially overlap the rear wheel assembly, without limitation. Similarly, the fuel tank assemblies 106-108 may be disposed in various locations with respect to the chassis 200, depending on the application. In some instances, it may be beneficial to mount various sizes of CNG fuel tanks 105 in locations that are less likely to be effected by the vehicle's ground clearance, suspension geometry, and the like, without limitation.

Figure 3:
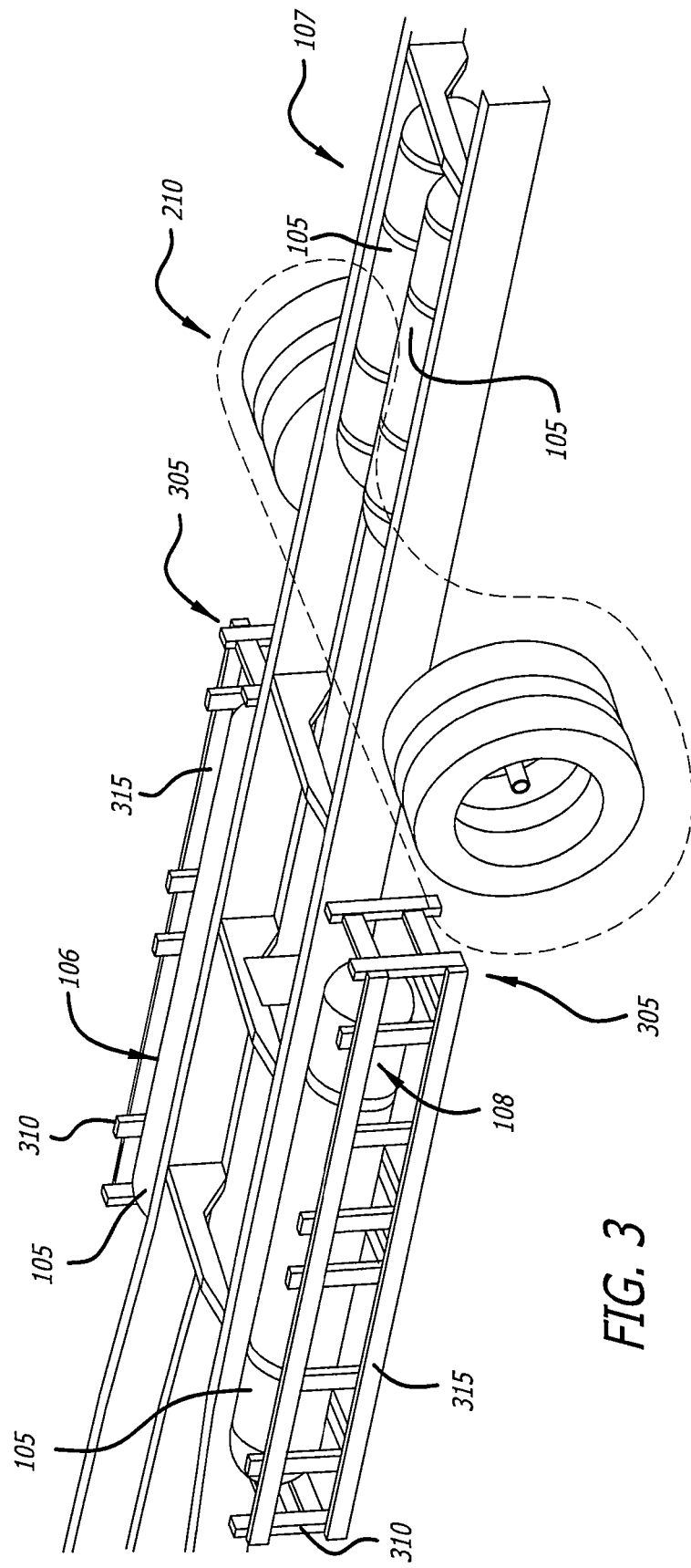
FIG. 3 illustrates an isometric perspective view of an alternative CNG fuel tank architecture, when disposed with an exemplary vehicle chassis.

FIG. 3 illustrates an isometric perspective view of a CNG fuel tank architecture which is substantially similar to the structure shown in FIG. 2. As shown, in one embodiment, caged structures 305 are disposed around the CNG fuel tanks 105. Although not shown, fuel tank shields 110 may also be used. In one embodiment, the caged structures 305 feature an exoskeleton formed of substantially metallic elements. More specifically, the structures 305 comprise a plurality of vertically disposed members 310 that may be welded and/or otherwise adhered to cross-members 315. Also, as shown in FIG. 3, the fuel tank assembly 107 features a plurality of CNG fuel tanks 105. It should be understood that each of the fuel tank assemblies 106-108 may feature one or more CNG fuel tanks 105 depending on the end use or application. For example, as shown in FIG. 4, CNG fuel tanks 105 may be stacked in a longitudinal manner so as to further increase CNG holding capacity, and therefore advantageously increase driving range of the vehicle.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed:

1. A pressurized gas fuel system for a vehicle, comprising:
a plurality of fuel tank assemblies coupled with a chassis of the vehicle, wherein the plurality of fuel tank assemblies comprises: a first fuel tank assembly and a second fuel tank assembly that are disposed immediately in front of a rear wheel assembly; and a third fuel tank assembly that is disposed immediately behind the rear wheel assembly;
a fuel tank shield disposed around each fuel tank assembly;
a caged structure disposed around each fuel tank shield;
fuel lines interconnecting the fuel tank assemblies and an engine of the vehicle;
an in-line filter and a gas regulator coupled with the fuel lines between the plurality of fuel tank assemblies and the engine;
a defueling assembly; and
one or more high pressure fill and check valves;
wherein the pressurized gas comprises any of compressed natural gas, propane, or an alternative gaseous fuel.

2. The fuel system of claim 1, wherein the first fuel tank assembly comprises one or more CNG fuel tanks.

3. The fuel system of claim 2, wherein the second fuel tank assembly comprises one or more CNG fuel tanks.

4. The fuel system of claim 3, wherein the third fuel tank assembly comprises one or more CNG fuel tanks.

5. The fuel system of claim 4, wherein the one or more CNG fuel tanks are made of any of aluminum, steel, carbon fiber, and the like.

6. The fuel system of claim 4, wherein the one or more CNG fuel tanks are configured to hold up to 125% of their rated operating pressure.

7. The fuel system of claim 6, wherein the one or more CNG fuel tanks are configured to be filled to a CNG fueling system pressure ranging between substantially 3,000 PSI and substantially 3,750 PSI.

8. The fuel system of claim 6, wherein the one or more CNG fuel tanks are configured to be filled to a CNG fueling system pressure ranging between substantially 3,600 PSI and substantially 4,500 PSI.

9. The fuel system of claim 1, wherein the fuel tank shield are configured to withstand extremely hot and cold temperatures.

10. The fuel system of claim 1, wherein the fuel tank shield is constructed of highly strong, yet lightweight material so as to not materially affect the handling characteristics of the vehicle.

11. The fuel system of claim 1, wherein the fuel tank shield comprises high-density, cross linked polyethylene to dissipate stress and impacts from gravel.

12. The fuel system of claim 1, wherein the fuel tank shield comprises a substantially cylindrical shape with a prominent cavity that houses the fuel tank assembly.

13. The fuel system of claim 12, wherein the fuel tank shield is configured to be coupled with a chassis of the vehicle by way of any of various straps, brackets, and the like.

14. The fuel system of claim 1, wherein the fuel tank shield is coupled with a supplemental heat shield configured to prevent excess heat from affecting the fuel capacity of the fuel tank assembly.

15. The fuel system of claim 14, wherein the supplement heat shield is substantially planar and comprises a substantially metallic material.

16. The fuel system of claim 14, wherein the supplement heat shield is substantially planar and comprises one or more layers of woven silica with a flexible aluminized finish.

17. The fuel system of claim 1, wherein the caged structure is configured to form an exoskeleton surrounding the fuel tank assembly.

18. The fuel system of claim 17, wherein the caged structure comprises a plurality of vertically disposed members that are coupled with cross-members.

* * * * *